United States Patent [19]

Hirose et al.

[11] Patent Number: 5,050,385
[45] Date of Patent: Sep. 24, 1991

[54] INNER CYLINDER FOR A GAS TURBINE COMBUSTOR REINFORCED BY BUILT UP WELDING

[75] Inventors: Fumiyuki Hirose; Nobuyuki Iizuka, both of Hitachi, Japan

[73] Assignee: Hitachi, Ltd., Tokyo, Japan

[21] Appl. No.: 541,946

[22] Filed: Jun. 22, 1990

Related U.S. Application Data

[63] Continuation of Ser. No. 891,133, Jul. 31, 1986, abandoned, which is a continuation of Ser. No. 832,123, Feb. 24, 1986, abandoned, which is a continuation of Ser. No. 691,905, Jan. 16, 1985, abandoned, which is a continuation of Ser. No. 537,846, Sep. 30, 1983, abandoned.

[30] Foreign Application Priority Data

Oct. 6, 1983 [JP] Japan .................. 57-174601

[51] Int. Cl.⁵ .................................. F02C 1/00
[52] U.S. Cl. ........................ 60/757; 60/756; 60/752
[58] Field of Search ............. 60/722, 752, 755, 754, 60/756, 757, 759; 228/119

[56] References Cited

U.S. PATENT DOCUMENTS

| | | | |
|---|---|---|---|
| 2,537,533 | 1/1951 | Ingalls | 228/119 |
| 2,742,762 | 4/1956 | Kuhring | 60/752 |
| 2,840,989 | 7/1958 | Macaulay | 60/756 |
| 2,993,337 | 7/1961 | Cheeseman | 60/759 |
| 3,110,086 | 11/1963 | Phillips | 29/163.5 R |
| 3,469,305 | 9/1969 | Tamura | 29/402.18 |
| 3,889,882 | 8/1975 | Parker | 60/752 |
| 4,049,186 | 9/1977 | Hanneman et al. | 228/119 |
| 4,234,119 | 11/1980 | Masaoka et al. | 228/125 |
| 4,355,589 | 10/1982 | Wetmore | 172/699 |

FOREIGN PATENT DOCUMENTS

| | | | |
|---|---|---|---|
| 162220 | 9/1984 | Japan | 228/119 |
| 286089 | 3/1928 | United Kingdom | 228/119 |
| 685068 | 12/1952 | United Kingdom | 60/748 |
| 2023232 | 12/1979 | United Kingdom | 60/755 |

Primary Examiner—Louis J. Casaregola
Assistant Examiner—Timothy S. Thorpe
Attorney, Agent, or Firm—Antonelli, Terry, Stout & Kraus

[57] ABSTRACT

A gas turbine combustor has an inner cylinder provided with a multiplicity of louvers for introducing cooling air and a plurality of air ports for introducing combustion air. The portions of the inner cylinder wall at both ends of each louver, where the concentration of stress due to thermal stress is heaviest, is reinforced by build-up welding thereby to prevent cracking at these portions of the cylinder wall. The build-up welding effectively stops the propagation of crack happened to be caused in the inner cylinder wall for any reason. The portions of the inner cylinder wall around the air ports also may be reinforced by build-up welding over the entire peripheries of these air ports. The build-up weld on the periphery of each air port prevents any crack from being propagated to the brim of each air port.

2 Claims, 4 Drawing Sheets 5,050,385

INNER CYLINDER FOR A GAS TURBINE COMBUSTOR REINFORCED BY BUILT UP WELDING

This is a continuation of application Ser. No. 891,133, filed Jul. 31, 1986, which is a continuation of application Ser. No. 832,123 filed Feb. 24, 1986 which is a continuation application of Ser. No. 691,905 filed Jan. 16, 1985, which is a continuation application of Ser. No. 537,846 filed Sept. 30, 1983 all now abandoned.

BACKGROUND OF THE INVENTION

The present invention relates to a combustor for a gas turbine and, more particularly, to a gas turbine combustor having an inner cylinder provided with a multiplicity of louvers and a plurality of air ports.

Generally, the inner cylinder of a gas turbine combustor is provided with a plurality of air ports for supplying combustion air, and a multiplicity of louvers for generating a thin layer of air along the inner surface of the inner cylinder. The air layer on the inner surface of the inner cylinder serves as a heat-insulating layer for protecting the wall of the inner cylinder from the hot combustion gas. In order to generate this air layer over the entire area of the inner surface of the cylinder so as to attain an effective cooling of the inner cylinder, it is necessary to densely arrange a multiplicity of small louvers defining air inlets in the wall of the inner cylinder.

The simplest method of forming the louvers in the inner cylinder is to form a multiplicity of arcuate slits in the cylindrical wall and to form a radial step between the wall portions at both sides of each arcuate slit by a relative radial deformation between these wall portions. The arcuate slits thus shaped into the form of louvers serve as air inlets for generating a layer of air flowing along the inner surface of the inner cylinder. This method of forming the louvers is comparatively simple but involves a problem that cracks are liable to occur in the wall at both ends of each louver. Namely, a considerably large thermal stress is generated in the inner cylinder due to temperature variation of the same during the operation of the gas turbine, and the stress is concentrated at the keen edges at both ends of each louver to cause cracks in such keen edges. If the cracks are developed and propagated to adjacent louvers or air ports, the inner cylinder of the combustor will be locally cut to allow a small piece or fragment to be separated from the wall of the inner cylinder. Such a small piece or fragment will be blown into the turbine which is connected to the downstream side of the combustor as viewed in the direction of flow of the gas to seriously damage the moving and stationary blades in the turbine. In order to avoid the cracking in the inner cylinder wall, therefore, it has been a common measure to renew the inner cylinder at a frequency of, for example, every two years.

SUMMARY OF THE INVENTION

Accordingly, an object of the invention is to provide a combustor for a gas turbine in which the cracking in the louver formed in the inner cylinder is prevented to ensure a longer life of the inner cylinder and, hence, a longer period of operation of the gas turbine with an enhanced reliability.

To this end, according to the invention, there is provided a gas turbine combustor having an inner cylinder, wherein the portions of the inner cylinder wall around both ends of the air inlet provided by each louver are reinforced by build-up welding to prevent concentration of stress at such portions of the inner cylinder wall, thereby avoiding cracking in the inner cylinder wall. The brims of the air ports also are reinforced over all peripheries by build-up welding as necessitated thereby to stop the development and propagation of the crack.

DESCRIPTION OF THE PREFERRED EMBODIMENT

Before turning to the detailed description of a preferred embodiment, a general description will be made as to a conventional gas turbine combustor with reference to FIGS. 1 to 6, in order to make more clear the problem of the prior art and, hence, the subject to be achieved by the present invention.

Figure 1:
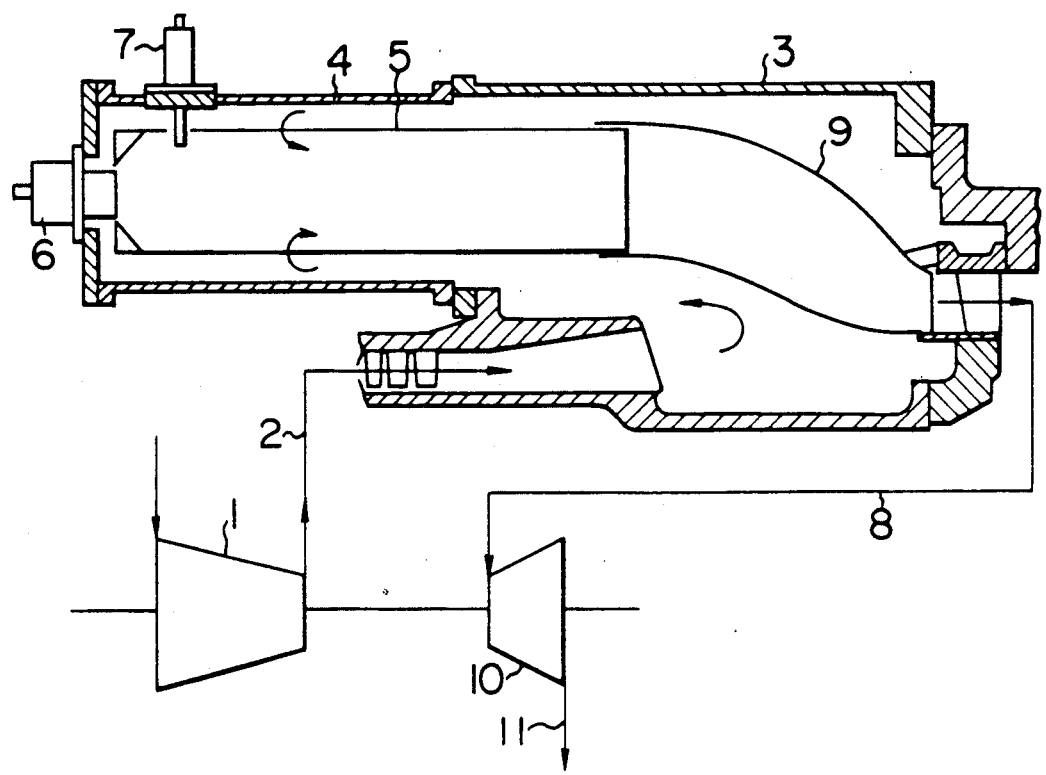
FIG. 1 is a sectional view showing general arrangement of a conventional gas turbine combustor.

Referring first to FIG. 1, a gas turbine has a compressor section 1 in which air is compressed. The compressed air 2 is then introduced through a turbine casing 3 into an outer cylinder 4 of the combustor and then into the inner cylinder 5 of the same. The fuel atomized by the fuel nozzle 6 into the inner cylinder is then mixed with and diffused in the air and the mixture is then burnt as it is ignited by an ignition plug 7. The combustion gas 8 flows into the turbine 10 through the inner cylinder 5 and the transition piece 9 so as to drive the turbine, and is then exhausted as an exhaust gas 11 into the atmosphere.

Figure 2:
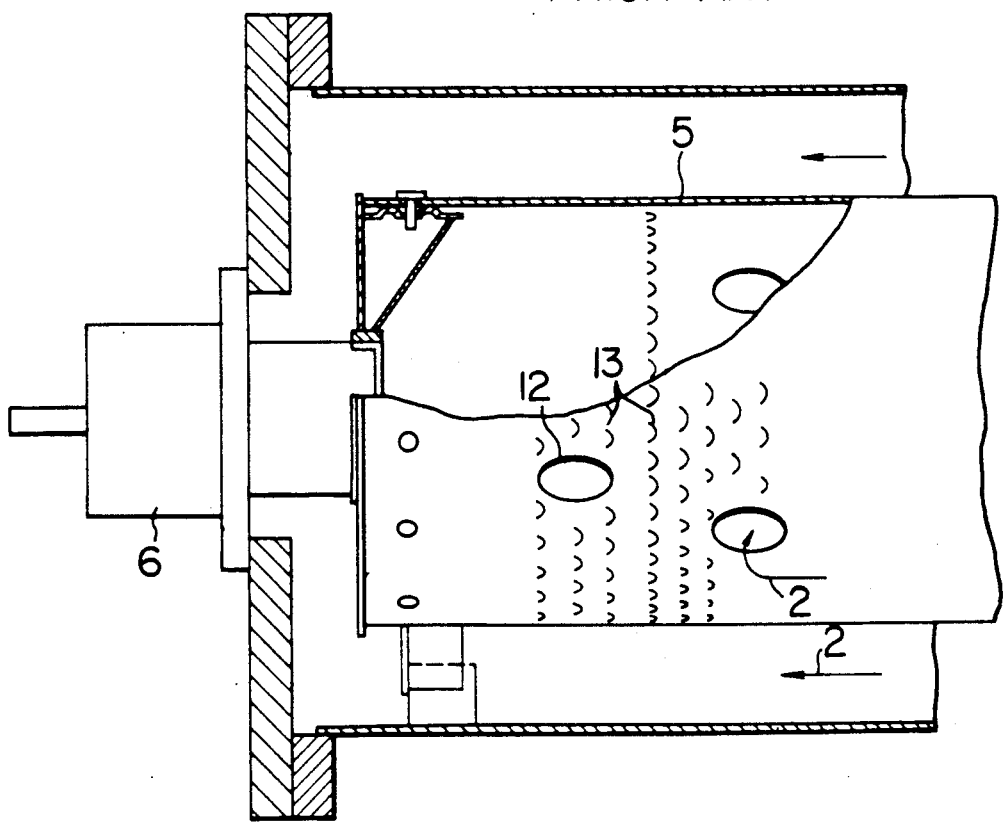
FIG. 2 is an enlarged sectional view of a part of the gas turbine combustor as shown in FIG. 1.

Referring now to FIG. 2, the inner cylinder 5 is provided with a plurality of circular air ports 12 for introducing the combustion air, and a multiplicity of louvers 13 defining air inlets for introducing cooling air for cooling the inner cylinder 5. The louvers 13 are arranged regularly and densely in a staggered manner. The compressed air 2 is introduced to the inside of the inner cylinder 5 through the air ports 12 or through the air inlets formed by the louvers 13. More specifically, most parts of the compressed air 2 are supplied through the air ports 12 to serve as the combustion air while only a small part of the same is introduced through the air inlets defined by the louvers 13 to effectively cool the inner cylinder 5.

Figure 3:
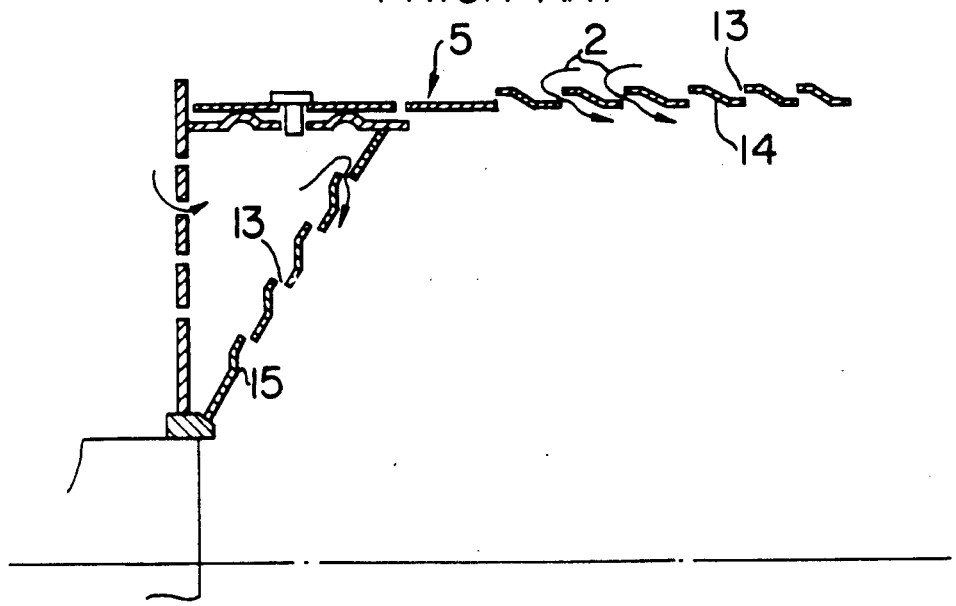
FIG. 3 is an enlarged sectional view of a part of an inner cylinder incorporated in the gas turbine combustor as shown in FIG. 1 and illustrating the behaviour of air flowing into the inner cylinder through air inlets provided by louver.

Referring now to FIG. 3, the air which passes through the louvers 13 into the inner cylinder 5 forms a thin layer of air moving along the inner surface 14 of the inner cylinder 5, thereby to prevent the hot combustion gas in the inner cylinder 5 from directly contacting the inner surface 14 of the inner cylinder 5 thereby to cool the latter. A cone 15 connected to the inner cylinder 5 also is provided with louvers 13 through which the air is introduced to effectively cool the cone 15.

Figure 4:
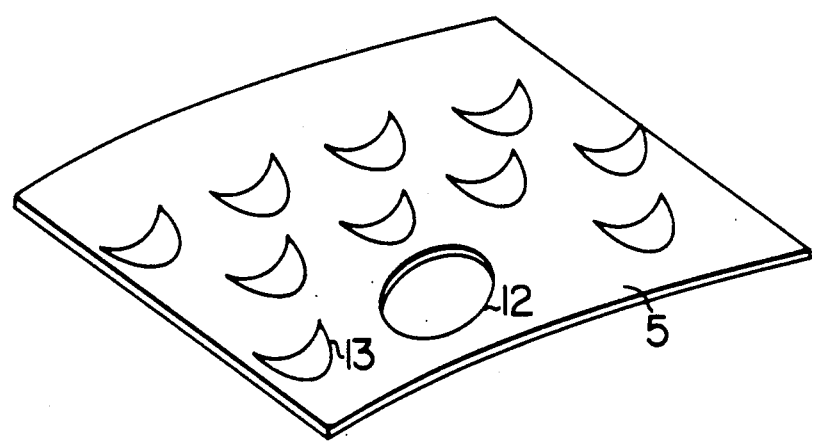
FIG. 4 is a partial perspective view of the inner cylinder as shown in FIG. 3.
Figure 5:
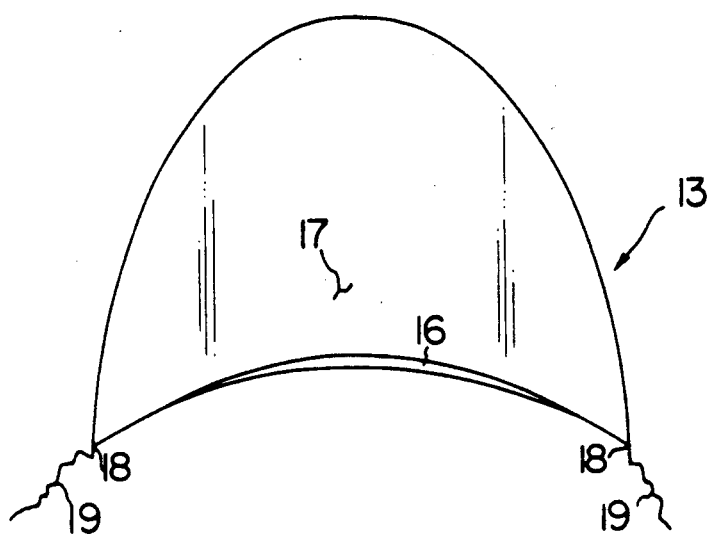
FIG. 5 is a detailed illustration of a louver formed in the inner cylinder as shown in FIG. 4.

Referring now to FIG. 4, the louvers 13 and the air ports 12 are located adjacent to each other in order to attain an effective cooling of the inner cylinder. Each louver provides an arcuate air inlet 16 as viewed from the upper side as shown in FIG. 5, the air inlet 16 being defined by a louver fin which protrudes substantially in a trapezoidal form from the outer surface of the inner cylinder 5 when viewed in the front side as viewed in FIG. 6. The height of the protrusion 17 is gradually decreased as the distance from the air inlet 16 is increased and becomes zero at the rear end of each louver 13.

The louvers 13 are formed integrally with the inner cylinder 5, by a process having the steps of pressing arcuate cutting edges to the aimed portions of the wall of the inner cylinder 5 to form arcuate slits by cutting, and pressing the wall portions around the slits in a press mold so as to form the protrusions 17. This process advantageously permits a very simple and efficient formation of a multiplicity of louvers 13 in quite a short period of time. However, both ends 18 of each air inlet 16 have a keen cut edge so that cracks 19 (see FIG. 5) tend to be generated at these ends due to concentration of thermal stress. In addition, since the distance between adjacent louvers 13, as well as the distance between the louver and an adjacent air port 12, is small, the crack or cracks generated around one louver 13 are developed and propagated to other louvers 13 or air ports 12 to cause a local breakage of the inner cylinder 5.

Figure 7:
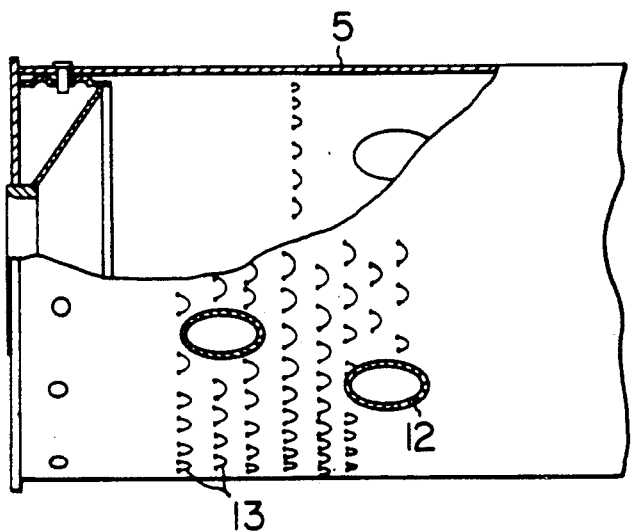
FIG. 7 is a partial enlarged view of a gas turbine combustor in accordance with the invention.

FIG. 7 shows an embodiment of the gas turbine combustor in accordance with the present invention. The inner cylinder of this embodiment is provided with a plurality of air ports 12 and a multiplicity of, e.g. 2000, louvers 13, both of which are arranged substantially in the same manner as that in the conventional gas turbine explained before in connection with FIG. 2.

The difference between the construction shown in FIG. 2 and that shown in FIG. 7 resides in the fact that the portions of the inner cylinder wall adjacent to the louvers 13 and air ports 12 are reinforced by build-up welding in the construction shown in FIG. 7.

Figure 6:
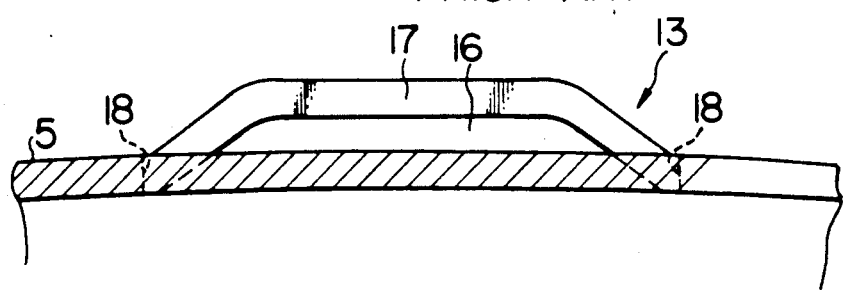
FIG. 6 is a front elevational view of the louver as shown in FIG. 5.
Figure 8:
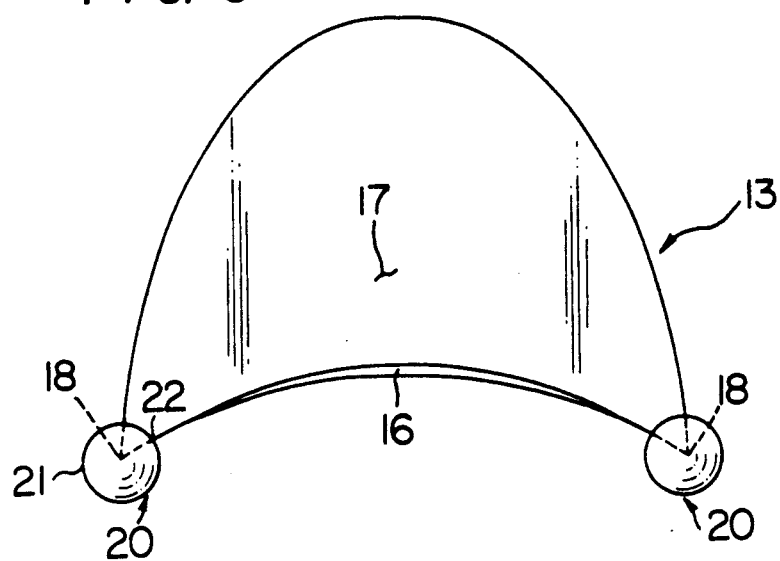
FIG. 8 is a detailed illustration of louver formed in the inner cylinder of the gas turbine combustor as shown in FIG. 7.
Figure 9:
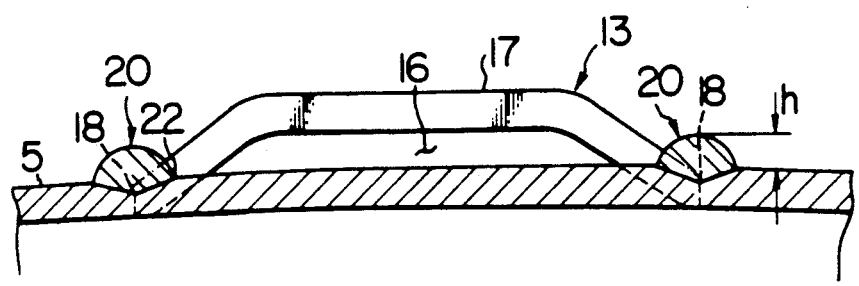
FIG. 9 is a front elevational view of the louver as shown in FIG. 8.

Namely, as shown in FIGS. 8 and 9, the louver 13 of this embodiment is substantially identical to the conventional louver shown in FIGS. 5 and 6 except for the reinforcement provided by build-up welding 20. More specifically, in the described embodiment of the invention, the build-up welding 20 is provided at each end 18 of the air inlet 16 formed by the louver 13 by TIG welding. Each weld 20 has a substantially circular form with its center located just on the keen cut edge of each end 18 of the air inlet 16 when viewed in plan as shown in FIG. 8. Each weld protrudes with an arcuate form when viewed in section as shown in FIG. 9. In the illustrated embodiment, the inner cylinder 5 is made from hastelloy to have a wall thickness of 1.6 mm. The length of the air inlet is about 13 mm, while the diameter of the build-up welding is 2 to 3 mm. The build-up welding 20 is also made with hastelloy. The height h of the build-up welding 20 takes the maximum value at the position of the keen cut edge at the end 18 of each air inlet 16 where the concentration of stress due to thermal stress is the heaviest, so that the generation of a crack is effectively avoided. The height h of the build-up weld 20 is gradually decreased as the distance from the keen cut edge is increased, so that the stress is absorbed in a radial form. In addition, the region 22 at which the outer periphery 21 of the weld 20 is in contact with the air inlet 16 exhibits a smooth surface as compared with the surface of the cut end 18 before the welding, thanks to the solidification of the molten metal, so that a crack can hardly start at the region 22. Even when the crack is generated, the development and propagation of such a crack is prevented because the inner cylinder is locally thickned by the build-up welding 20. The prevention of generation and development of the crack by build-up welding is effective particularly in the structures made from thin sheets, such as the inner cylinder 5 of the gas turbine combustor.

The louver 13 may protrude to the inner side of the inner cylinder 5, instead of projecting outwardly from the outer surface of the inner cylinder. In addition, the build-up welding 20 may be made on the inner surface of the inner cylinder 5, instead of the outer surface of the same, although in the described embodiment the build-up welding is preferably made on the outer surface of the inner cylinder 5 from the view point of efficiency of the work because the build-up welding is performed after forming the sheet material into the turbular form of the inner cylinder 5.

Figure 10:
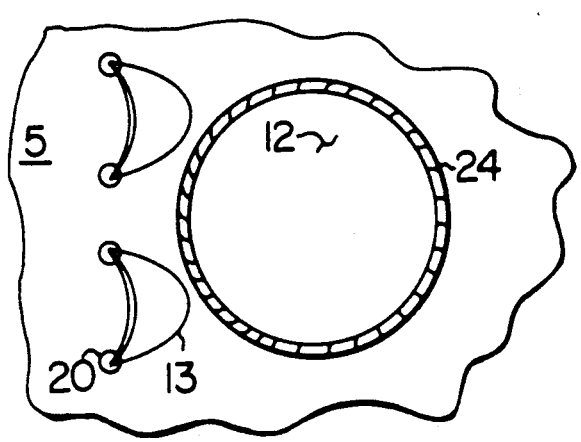
FIG. 10 shows the detail of an air port formed in the wall of the inner cylinder of the gas turbine combustor as shown in FIG. 7.
Figure 11:
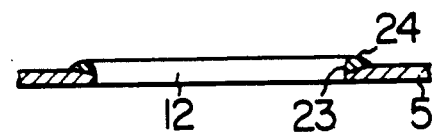
FIG. 11 is a sectional view of the air port as shown in FIG. 10.

Referring now to FIGS. 10 and 11, each air port 12 adjacent to the louver 13 is reinforced over its entire periphery by build-up welding as at 24. The build-up weld 24 effectively prevents the propagation of any crack generated in the vicinity of the louver from being propagated into the brim of the air port 12. Although in the described embodiment the build-up weld 24 is formed on the outer surface of the inner cylinder 5, this is not exclusive and the build-up weld 24 may be made on the inner surface of the inner cylinder 5. When the weld metal undesirably projects inwardly from the inner peripheral surface of the air port 12 as a result of the build-up weld 24, it is necessary to remove the weld metal to recover the correct inside diameter of the air port 12.

As has been described, according to the invention, the undesirable cracking in the wall portions of the inner cylinder near the louvers is effectively avoided without requiring any change in the positions of the air ports and the louvers in the combustor, i.e. without adversely affecting the combustion efficiency and cooling efficiency on the gas turbine combustor. In addition, any crack which has occurred in the wall of the inner cylinder is prevented from being developed and propagated. Consequently, according to the invention, it is possible to attain a longer life for the gas turbine combustor, thereby to enhance the reliability in the long-term operation of the gas turbine.

What is claimed is:

1. A gas turbine combustor comprising:
 an outer cylinder;
 an inner cylinder disposed within said outer cylinder to define therebetween a predetermined annular space through which combustion air and cooling air pass;

a plurality of air inlets provided in a peripheral wall of said inner cylinder through which cooling air is introduced into said inner cylinder to cool said peripheral wall of said inner cylinder, each of said air inlets being defined between two peripheral wall portions of said inner cylinder separated from each other by an arcuate slit, one of said peripheral portions is radially disaligned with respect to the other peripheral wall portion so as to form said air inlet and provide keen cut edges at opposite ends of the arcuate slit and;

a built-up weldment welding cracks formed at each of said keen cut edges due to the disalignment of said peripheral wall portions provided at the respective keen cut edges, a molten metal of said built-up weldment having a substantially hemispherical shape and protruding outwardly from said inner cylinder, wherein said built-up weldment is formed of the same material as said inner cylinder, a height of the respective built-up weldment gradually decreases as a distance from the respective keen edges decreases so as to enable a stress absorption in a radial direction, and wherein a center of said substantially hemispherical shape is located on the respective keen cut edges so as to enable the cooling air to be smoothly introduced into the inner cylinder.

2. A gas turbine combustor according to claim 1, further comprising:

a plurality of circular air ports provided in said peripheral wall of said inner cylinder for introducing combustion air into said inner cylinder; and a second built-up weldment provided along a peripheral edge of each of said circular air ports, said second built-up weldment having a substantially semicircular shape in cross section thereof and protruding outwardly from said inner cylinder, and wherein said second built-up weldment is formed of the same material as said inner cylinder.

* * * * *